United States Patent
Larson, Jr.

[11] Patent Number: 5,514,209
[45] Date of Patent: May 7, 1996

[54] HOT MELT JET INK COMPOSITION

[75] Inventor: Richard J. Larson, Jr., Walpole, N.H.

[73] Assignee: Markem Corporation, Keene, N.H.

[21] Appl. No.: 327,994

[22] Filed: Oct. 24, 1994

Related U.S. Application Data

[63] Continuation-in-part of Ser. No. 319,733, Oct. 7, 1994, which is a continuation-in-part of Ser. No. 57,088, May 4, 1993, Pat. No. 5,354,368.

[51] Int. Cl.$^6$ ............................ C09D 11/08; C09D 11/12
[52] U.S. Cl. .................... 106/30 A; 106/22 A; 106/23 A
[58] Field of Search ............................... 106/30 A, 22 A, 106/23 A

[56] References Cited

U.S. PATENT DOCUMENTS

| | | | |
|---|---|---|---|
| 2,890,124 | 6/1959 | Mange | 106/23 A |
| 4,336,067 | 6/1982 | Shackle et al. | 106/30 A |
| 4,401,791 | 8/1983 | Hultzsch et al. | 525/132 |
| 4,426,227 | 1/1984 | Keeling et al. | 106/27 A |
| 4,472,537 | 9/1984 | Johnson et al. | 523/160 |
| 4,506,059 | 3/1985 | Hultzsch et al. | 106/30 R |
| 4,659,383 | 4/1987 | Lin et al. | 106/27 A |
| 4,684,956 | 8/1987 | Ball | 106/22 A |
| 4,724,002 | 2/1988 | Shibata et al. | 106/23 A |
| 4,851,045 | 7/1989 | Taniguchi | 106/22 A |
| 5,000,786 | 3/1991 | Matsuzaki | 106/22 A |
| 5,006,170 | 4/1991 | Schwarz et al. | 106/22 A |
| 5,028,646 | 7/1991 | Miller et al. | 524/77 |
| 5,037,447 | 8/1991 | Nishimoto et al. | 8/467 |
| 5,041,482 | 8/1991 | Ornsteen et al. | 524/272 |
| 5,053,079 | 11/1991 | Haxell et al. | 106/30 A |
| 5,066,332 | 11/1991 | Brown et al. | 106/30 A |
| 5,084,099 | 1/1992 | Jaeger et al. | 106/22 H |
| 5,093,406 | 3/1992 | Lossner et al. | 524/483 |
| 5,122,187 | 6/1992 | Schwarz et al. | 106/22 A |
| 5,185,035 | 2/1993 | Brown et al. | 106/30 A |
| 5,190,582 | 3/1993 | Shinozuka et al. | 106/20 D |
| 5,259,873 | 11/1993 | Fujioka | 106/20 C |
| 5,259,874 | 11/1993 | Miller et al. | 106/30 A |
| 5,286,288 | 2/1994 | Tobias et al. | 106/20 B |
| 5,298,062 | 3/1994 | Davies et al. | 106/20 R |
| 5,409,530 | 4/1995 | Kanbayashi et al. | 106/30 A |

*Primary Examiner*—Helene Klemanski
*Attorney, Agent, or Firm*—Brumbaugh, Graves, Donohue & Raymond

[57] ABSTRACT

A hot melt jet ink composition comprising a glycerol ester of a hydrogenated rosin and microcrystalline wax exhibits good adhesion and resistance to offset at low temperatures.

24 Claims, 6 Drawing Sheets

HOT MELT JET INK COMPOSITION

SPECIFICATION

This application is a continuation-in-part of my copending U.S. application Ser. No. 08/319,733 filed Oct. 7, 1994 which is a continuation-in-part of U.S. application Ser. No. 08/057,088 filed May 4, 1993 now U.S. Pat. No. 5,354,368, the disclosures of which are incorporated by reference herein.

This invention relates to hot melt jet ink compositions. More specifically, this invention is directed to hot melt jet ink compositions especially suitable for printing onto substrates which are stored at low temperatures. The hot melt jet inks provide excellent adhesion, resistance to offset, scratch resistance, and rub resistance at standard refrigerator and freezer temperatures.

BACKGROUND OF THE INVENTION

Typically, ink jet printing involves forming characters on a substrate by ejecting ink droplets from a printhead having one or more nozzles. In order to provide a high quality image, hot melt jet ink compositions which are solid at room temperature, but molten at jetting temperatures are used. Unfortunately, such hot melt jet ink compositions, while capable of providing a high quality image at ambient temperatures, are readily abraded or deformed upon handling of a printed substrate which is stored in a low temperature environment, such as in a refrigerator or freezer. In many cases, such low temperature storage causes the ink to become brittle. As a result, the ink may crack or even worse, flake off the printed substrate. In addition, exposure to low temperature may cause the ink to smear or exhibit poor scratch resistance. Typically, a hot melt composition which has excellent adhesion, scratch resistance and flexibility at low temperature may have too much tack and exhibits undesirable offset and pickoff at ambient temperature. Such unintentional transfer of the ink from a freshly printed substrate is particularly troublesome since hot melt jet ink compositions are applied to substrates which are at ambient temperatures, for example typically not lower than at 40° F., at the time of application.

SUMMARY OF THE INVENTION

Accordingly, it is an object of the invention to provide hot melt jet inks that overcome the disadvantages of the prior art.

Another object of the invention is to provide an improved ink for hot melt jet ink printers that produces print with a sharp image of high resolution on substrates at low temperature which is resistant to abrasion.

A further object of the invention is to provide an improved ink for hot melt jet ink printers that produces print on substrates stored at low temperature having improved resistance to offset immediately after printing at ambient temperature.

These and other objects of the present invention are attained by providing a hot melt jet ink comprising a glycerol ester of a hydrogenated rosin, microcrystalline wax and a coloring agent. Preferably, the hot melt jet ink also comprises a polyethylene wax.

A process for making such a hot melt jet ink composition comprises the steps of melting a microcrystalline wax, and adding a glycerol ester of a hydrogenated rosin to the microcrystalline wax wherein the hot melt jet ink composition exhibits improved performance at low temperature.

The ink compositions of the present invention have the property of excellent adhesion, flexibility, scratch resistance, and improved resistance to offset and rub resistance, even when subjected to low temperature.

DESCRIPTION OF THE PREFERRED EMBODIMENTS

Figure 1:
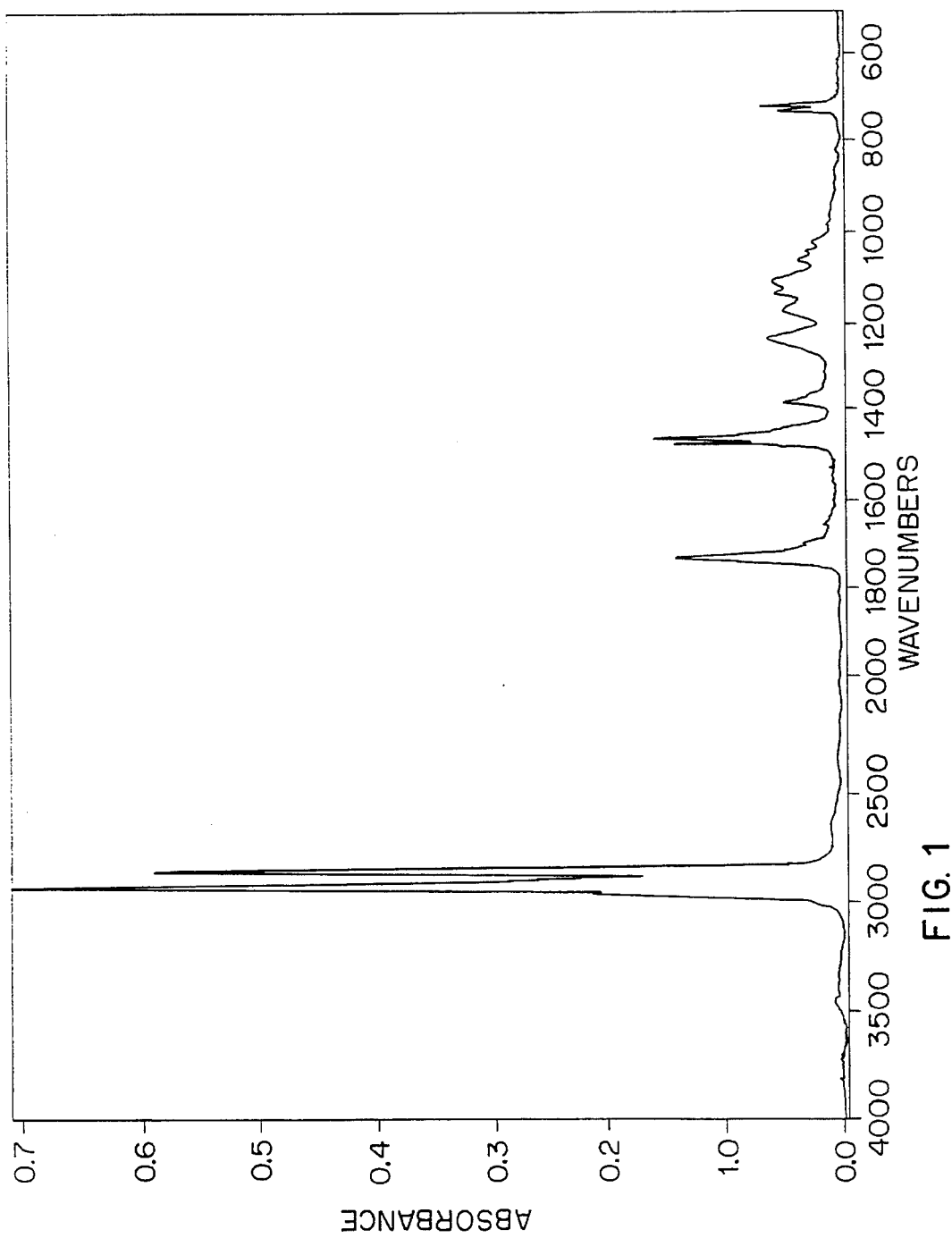
FIG. 1 is an FTIR spectrum of an ink composition according to the invention.

Hot melt jet inks according to the invention which are suitable for use in ink jet printers typically have a melt viscosity of at least 10 centipoise, preferably at least 20 centipoise, most preferably in the range from 20 to 25 centipoise, at a temperature of at least 105° C., preferably from 115° C. to 140° C., most preferably at 130° C. to 140° C. Typically, the hot melt ink according to the present invention is jetted at a temperature of about 135° C.

The ink compositions of the present invention exhibit good flexibility at temperatures at least as low as 0° F. to 40° F. yet can be applied to a substrate at ambient temperature. Surprisingly, the inks of the present invention exhibit excellent adhesion, flexibility, scratch resistance, offset resistance and rub resistance at standard refrigerator temperatures of about 40° F. and/or freezer temperatures at least as low as 0° F., yet are not very tacky when applied to a substrate at ambient temperature. Remarkably, these ink compositions exhibit resistance to offset resistance and pickoff at ambient temperature, while remaining flexible at low temperature.

The essential component of the present invention is a glycerol ester of a hydrogenated rosin which contributes to the overall adhesion and cohesive properties of the ink. Typically, the rosin has a softening point not less than 60° C., preferably less than 100° C., most preferably between 80° C. to 88° C., an acid number less than 10, and a molecular weight of 500 to 50,000. Most preferred is a rosin such as Foral 85 available from Hercules Incorporated. The rosin is present in an amount of 15% to 75% by weight, preferably 25% to 55% by weight, most preferably 30% to 45% by weight of the ink composition.

Preferably, the hot melt jet ink of the present invention includes a microcrystalline wax. More preferably the microcrystalline wax remains flexible at low temperatures and has a congealing point of from 130° F. to 170° F., most preferably from 150° F. to 160° F. A preferred microcrystalline wax is Okerin 103 available from Astor Wax Corp., Doraville, Ga. The microcrystalline wax is present in an amount 15% to 70% by weight, preferably 25% to 65% by weight, most preferably 35% to 60% by weight of the ink composition.

The ink composition may also include a polyethylene wax which may increase hardness, improve abrasion resistance, decrease tack, increase offset resistance, and add flexibility. Preferably the polyethylene wax is a homopolymer polyethylene with low density and a low average molecular weight. Most preferably the polyethylene wax has a melting point of 90° C.–110° C., a density of 0.85 g/cm³ to 0.95 g/cm³ and an average molecular weight of about 2,000 to 4,500, preferably 2,500–3,500. The polyethylene wax is present in an amount of 10% to 60% by weight, preferably 15% to 40% by weight, most preferably 15% to 30% by weight of the ink composition. A preferred polyethylene wax is Luwax AL3 available from BASF Aktiengesellschaft in Germany.

Because hot melt jet ink compositions prepared in accordance with the invention are in a hot molten state during jetting, antioxidants to inhibit thermally induced oxidation may be added to the ink composition. Suitable antioxidants include those conventionally used in the art, for example dibutyl hydroxy toluene compounds and the like. Antioxidant is present in the amount of 0.1% to 5.0% by weight, preferably 0.5% to 3.0% by weight of the ink composition.

Suitable coloring agents, present in amount of at least 0.1% to 9.0% by weight, preferably 0.5% to 3.0% by weight of the ink composition include pigments and dyes. Any dye or pigment may be chosen provided it is capable of being dispersed in the ink composition and is compatible with the other ink components. Any pigment particles should have a diameter of less than 1 micron. Preferred dyes include Nitrofast Blue 2B (C.I. Solvent Blue 104), Morplus Magenta 36 (C.I. Solvent Red 172), Oracet Yellow GHS, and, for black ink, combinations thereof.

Hot melt jet ink compositions of the present invention are generally prepared by combining together all the ink ingredients except for the coloring agent and glycerol ester of the hydrogerated rosin, heating the mixture to its melting point, which generally does not exceed 135° C., and slowly stirring until the mixture is homogeneous. The glycerol ester of the hydrogerated rosin is then added to the molten mixture. The coloring agent is subsequently added to this mixture containing the glycerol ester of the hydrogerated rosin while stirring until homogeneously dispersed. The molten mixture is then filtered to remove particles larger than 1 micron in size.

Specific embodiments of hot melt jet ink compositions in accordance with the present invention will now be described in detail. These examples are intended to be illustrative, and the invention is not limited to the materials set forth in these embodiments. All parts are by weight of the ink compositions unless otherwise indicated.

EXAMPLE 1

| Ingredient | Parts |
| --- | --- |
| Foral 85 | 39.22 |
| Okerin 103 | 39.22 |
| Luwax AL3 | 19.61 |
| Irganox ® 1010 | 0.98 |
| Nitrofast Blue 2B | 0.98 |

A hot melt jet ink prepared in accordance with Example 1 resulted in a composition exhibiting excellent flexibility at 0° F. and excellent resistance to offset after printing at ambient temperature, particularly 50° F. to 74° F. Irganox® 1010 is a derivative of dibutyl hydroxycinnamate available from Ciba-Geigy Corporation.

EXAMPLE 2

The low temperature performance of an ink prepared according to Example 1 was determined as follows. A sample of the ink composition (1.5 g) was placed into an aluminum dish having a 2-inch diameter. The ink was melted thereby forming a film in the aluminum dish. The ink containing aluminum dish was stored in a freezer having a temperature of –4° C. or 25° F. for at least 15 minutes. The aluminum dish was then flexed in the low temperature environment. No ink cracking or brittleness was observed.

EXAMPLE 3

The low temperature performance of an ink prepared according to Example 1 applied to some of the typical surfaces used in food packaging was determined as follows. The ink was jetted onto the following substrates:

oriented polypropylene with a polyamide coating metallized film laminated on paper ethylene vinyl acetate/polyethylene copolymer coated paper polyethylene high slip oriented polypropylene The printed substrates were stored in a freezer having a temperature of 0° F. or –18° C. for at least 15 minutes. The printed substrates were then flexed in the low temperature environment. Hardly any ink flaking was observed for any of the printed substrates.

EXAMPLE 4

Figure 2:
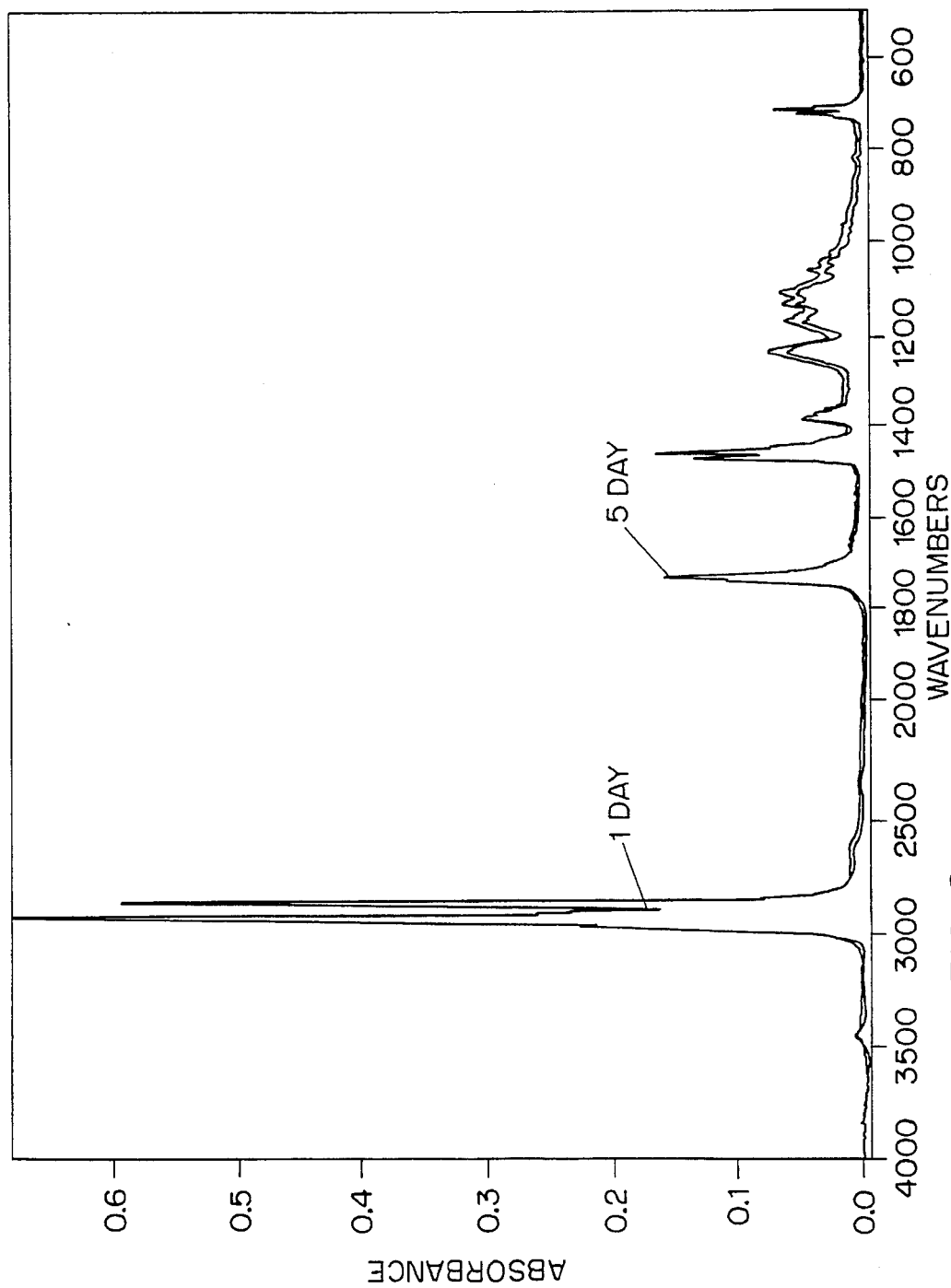
FIG. 2 is an FTIR spectrum of an ink composition according to the invention after 5 days storage at 140° F. superimposed on FIG. 1.
Figure 3:
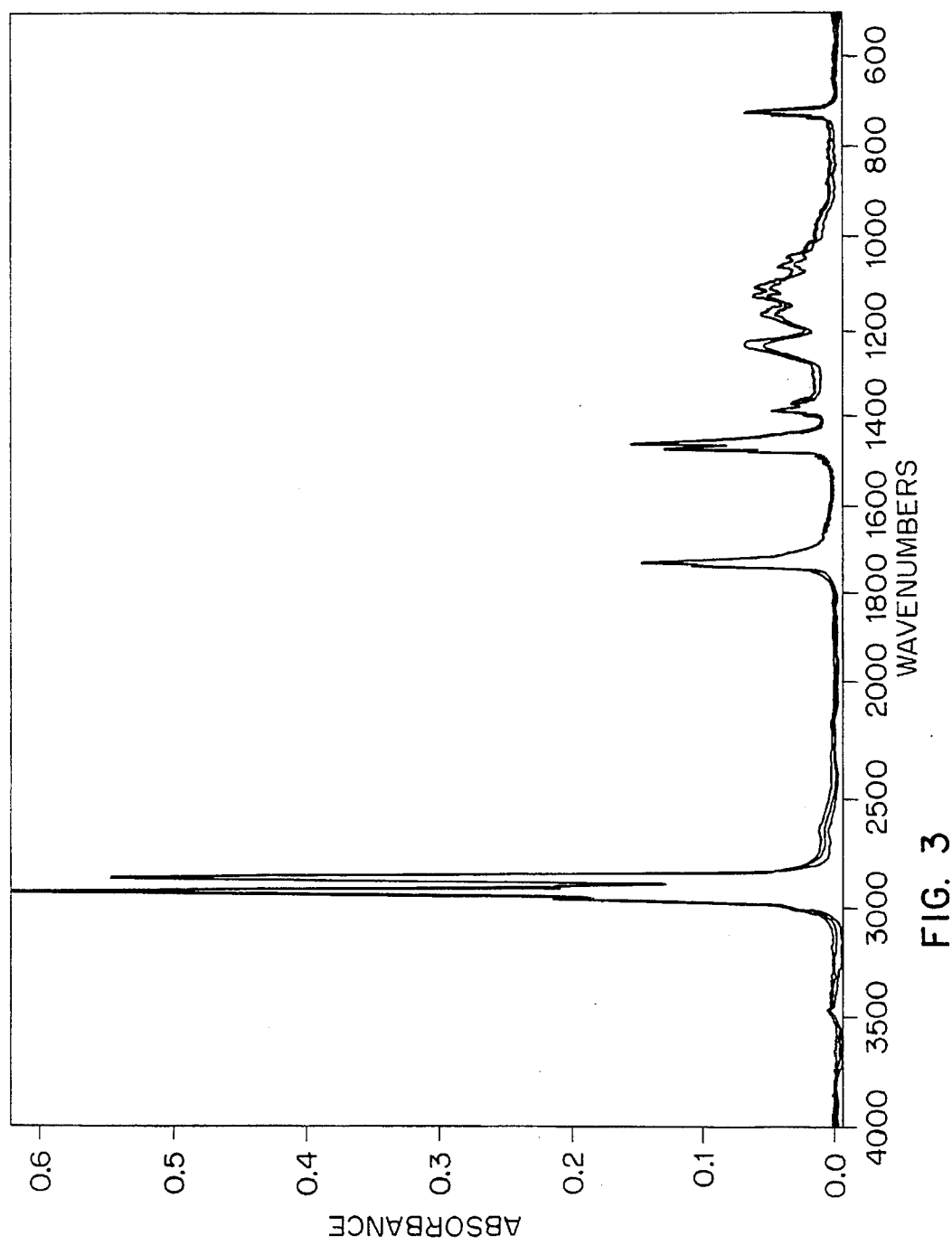
FIG. 3 is an FTIR spectrum of an ink composition according to the invention after 12 days storage at 140° F. superimposed on FIG. 1 and FIG. 2.

The thermal stability of an ink composition prepared according to Example 1 was determined as follows. A 10 gram sample of the ink was placed in an aluminum dish. The dish was placed in a forced hot air oven at 140° C. for 12 days. A portion of the ink was removed and melted onto a KBr disk and the Fourier Transform Infrared (FTIR) spectrum was recorded. The FTIR spectrum of the sample on day 1 prior to heating at 140° C. for 12 days is shown in FIG. 1. The FTIR spectrum at day 1 and day 5 is shown in FIG. 2. The FTIR spectrum at day 12 superimposed on the spectrum obtained at day 5 and day 1 is shown in FIG. 3. As can be seen from FIG. 3, no significant shifts in the FTIR spectrum of the hot melt ink composition were observed over 12 days of storage at 140° C.

Figure 4:
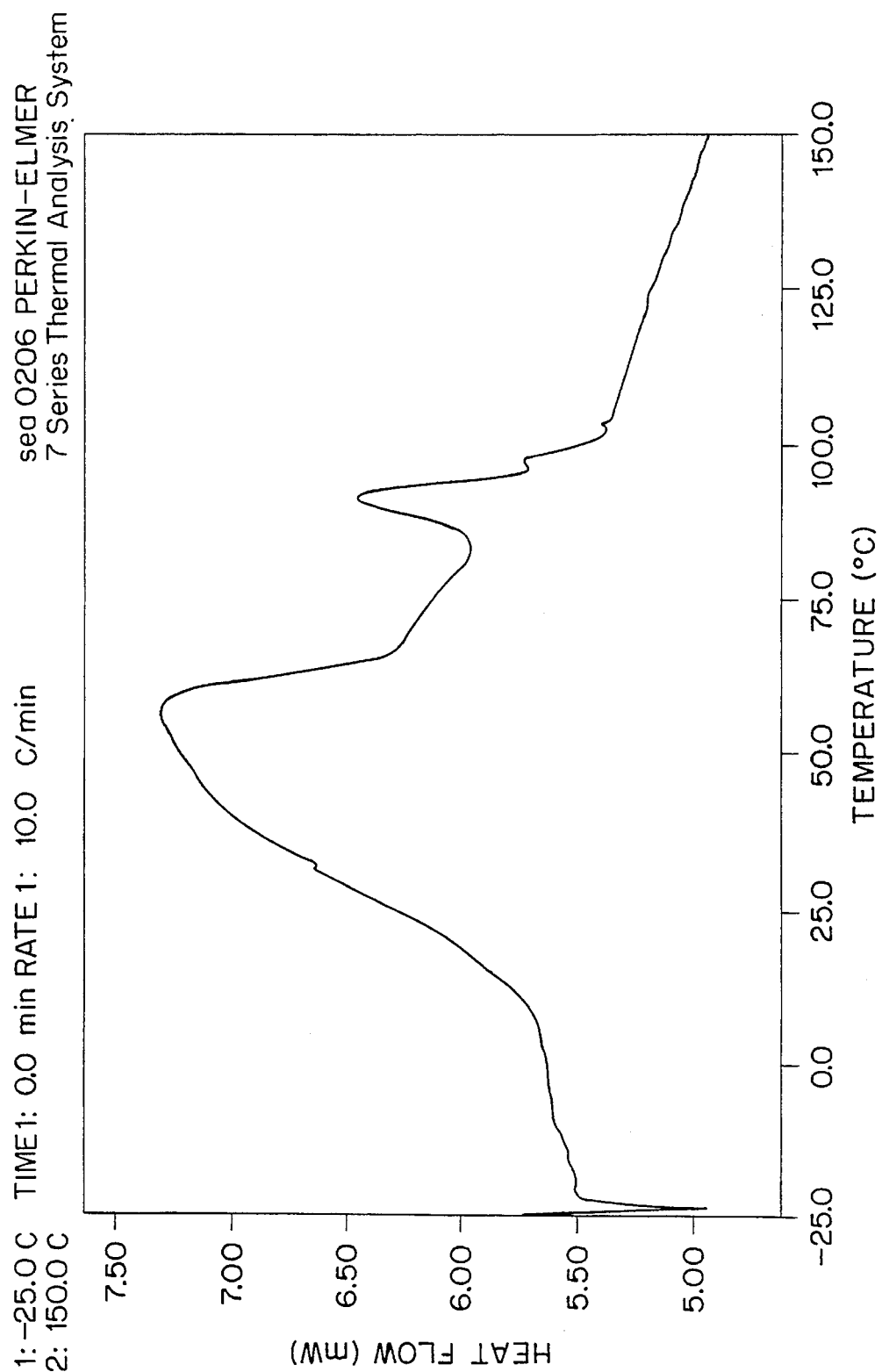
FIG. 4 is a DSC endotherm of an ink composition according to the invention.
Figure 5:
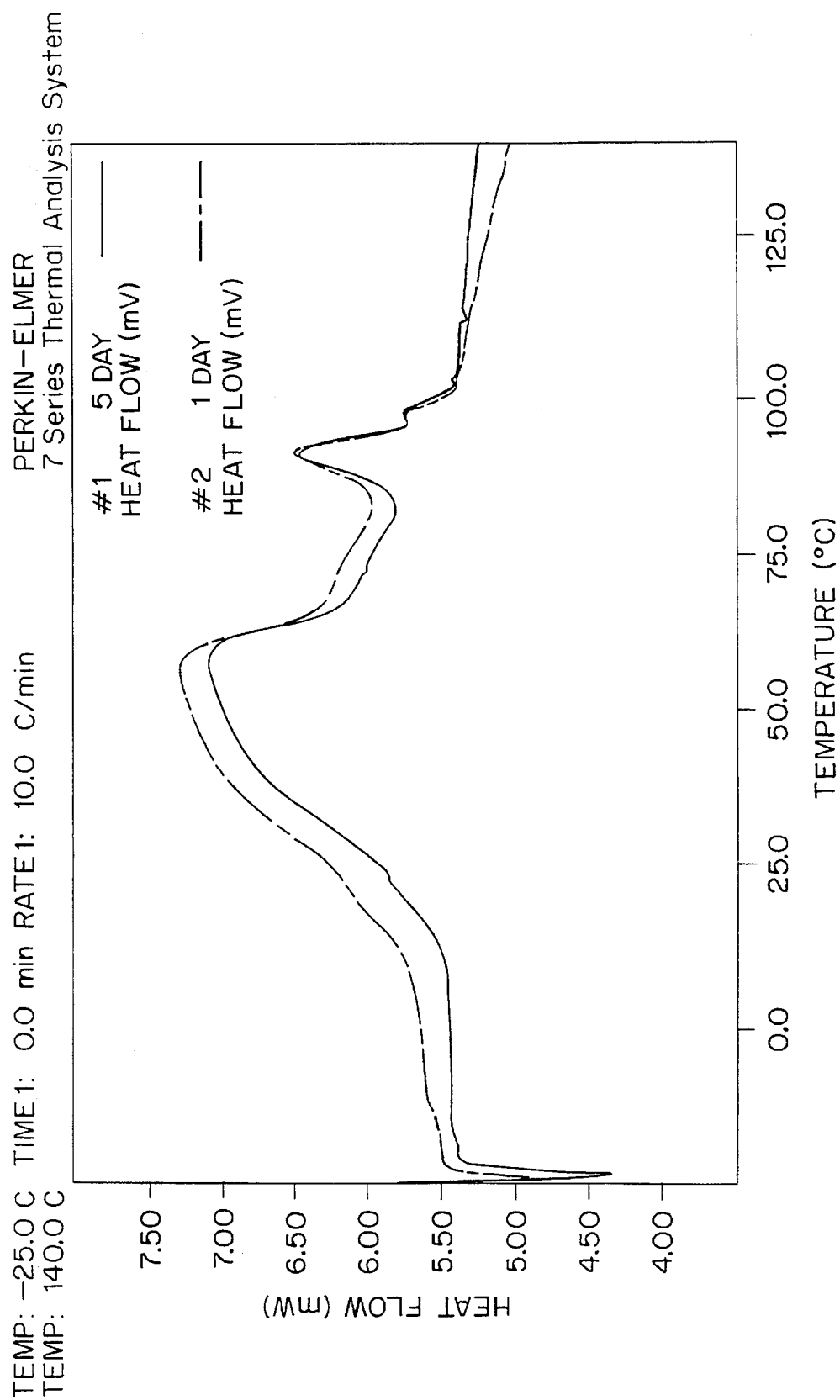
FIG. 5 is a DSC endotherm of an ink composition according to the invention after 5 days storage at 140° F. superimposed on FIG. 4.
Figure 6:
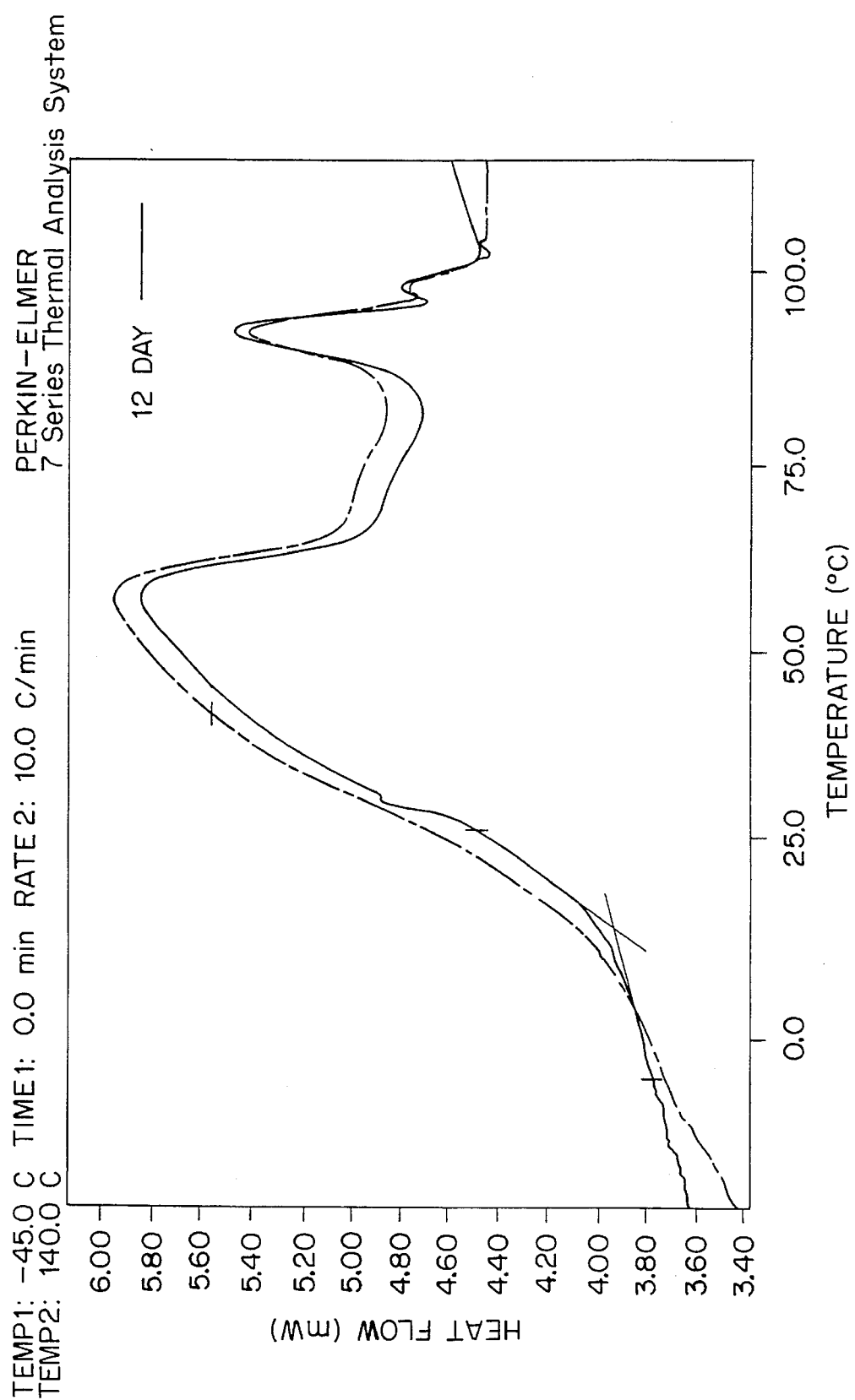
FIG. 6 is a DSC endotherm of an ink composition according to the invention after 12 days storage at 140° F. superimposed on FIG. 4.

In addition, differential scanning calorimetry (DSC) endotherms were obtained using an approximate 5 mg ink sample. FIG. 4 is a DSC endotherm for the ink on day 1 before storage at 140° C. FIG. 5 shows the DSC endotherm for a 4.9 mg ink sample after 5 days of storage at 140° C. superimposed on FIG. 4. FIG. 6 shows the DSC endotherm measured for a 5.7 mg ink sample after 12 days of storage at 140° C. superimposed on FIG. 4. As can be seen from FIG. 5, no significant changes in the DSC endotherms were observed.

Finally, the viscosity of the ink composition was determined at 135° C. giving the following result:

| Day | Viscosity (centipoise) |
| --- | --- |
| 1 | 22.4 |

| Day | Viscosity (centipoise) |
| --- | --- |
| 12 | 25.9 |

These tests indicated ink compositions according to the invention have excellent thermal stability at temperatures as high as 140° C.

Although the invention has been described herein with reference to specific embodiments, many modifications and variations therein will readily occur to those skilled in the art. Accordingly, all such variations and modifications are included within the scope of the invention.

I claim:

1. A hot melt jet ink composition for application to a substrate comprising a glycerol ester of a hydrogenated rosin, microcrystalline wax and a coloring agent, the ink composition exhibiting improved performance at low temperatures.

2. A hot melt jet ink composition according to claim 1 further comprising a polyethylene wax.

3. A hot melt jet ink composition according to claim 1, wherein the glycerol ester of a hydrogenated rosin is present in an amount of 15% to 75% by weight of the hot melt jet ink composition.

4. A hot melt jet ink composition according to claim 3, wherein the glycerol ester of a hydrogenated rosin is present in an amount of 25% to 55% by weight of the hot melt jet ink composition.

5. A hot melt jet ink composition according to claim 4, wherein the glycerol ester of a hydrogenated rosin is present in an amount of 30% to 45% by weight of the hot melt jet ink composition.

6. A hot melt jet ink composition according to any one of claims 2, 3, 4, or 5, wherein the microcrystalline wax is present in an amount of 15% to 70% by weight of the hot melt jet ink composition.

7. A hot melt jet ink composition according to claim 6, wherein the microcrystalline wax is present in an amount of 25% to 60% by weight of the hot melt jet ink composition.

8. A hot melt jet ink composition according to claim 7, wherein the microcrystalline wax is present in an amount of 35% to 60% by weight of the hot melt jet ink composition.

9. A hot melt jet ink composition according to claim 8 further comprising a polyethylene wax.

10. A hot melt jet ink composition according to claim 9, wherein the polyethylene wax is present in an amount of 10% to 60% by weight of the ink composition.

11. A hot melt jet ink composition according to claim 10, wherein the polyethylene wax is present in an amount of 15% to 40% by weight of the ink composition.

12. A hot melt jet ink composition according to claim 11, wherein the polyethylene wax is present in an amount of 15% to 25% by weight of the ink composition.

13. A hot melt jet ink composition comprising 15% to 75% by weight of a glycerol ester of a hydrogenated rosin, 15% to 70% by weight of a microcrystalline wax and 10% to 60% by weight of a polyethylene wax.

14. A process for making a hot melt jet ink composition comprising the steps of:

melting a microcrystalline wax, and adding a glycerol ester of a hydrogenated rosin to the molten microcrystalline wax, wherein the glycerol ester of a hydrogenated rosin and microcrystalline wax are present in an amount such that the hot melt jet ink composition exhibits improved performance at low temperatures.

15. A process according to claim 14, wherein the glycerol ester of a hydrogenated rosin is present in an amount of 15% to 75% by weight of the hot melt jet ink composition.

16. A process according to claim 15, wherein the glycerol ester of a hydrogenated rosin is present in an amount of 25% to 55% by weight of the hot melt jet ink composition.

17. A process according to claim 16, wherein the glycerol ester of a hydrogenated rosin is present in an amount of 30% to 45% by weight of the hot melt jet ink composition.

18. A process according to claims 14, 15, 16, or 17, wherein the microcrystalline wax is present in an amount of 15% to 70% by weight of the hot melt jet ink composition.

19. A process according to claim 18, wherein the microcrystalline wax is present in an amount of 25% to 65% by weight of the hot melt jet ink composition.

20. A process according to claim 19, wherein the microcrystalline wax is present in an amount of 35% to 60% by weight of the hot melt jet ink composition.

21. A process according to claim 20 further comprising the step of adding a polyethylene wax to the molten microcrystalline wax prior to adding the hydrogenated rosin.

22. A process according to claim 21, wherein the polyethylene wax is present in an amount of from 10% to 60% by weight of the hot melt jet ink composition.

23. A process according to claim 22, wherein the polyethylene wax is present in an amount of 15% to 40% by weight of the hot melt jet ink composition.

24. A process according to claim 23, wherein the polyethylene wax is present in an amount of 15% to 30% by weight of the hot melt jet ink composition.

* * * * *